US009982584B2

(12) United States Patent
Püschel et al.

(10) Patent No.: US 9,982,584 B2
(45) Date of Patent: May 29, 2018

(54) DEVICE FOR THE AFTERTREATMENT OF EXHAUST GAS FROM A MOTOR VEHICLE

(71) Applicants: Maximilian Püschel, Landshut (DE); Herbert Albert, Erlangen (DE)

(72) Inventors: Maximilian Püschel, Landshut (DE); Herbert Albert, Erlangen (DE)

(73) Assignee: MAN Truck & Bus AG, Munich (DE)

( * ) Notice: Subject to any disclaimer, the term of this patent is extended or adjusted under 35 U.S.C. 154(b) by 127 days.

(21) Appl. No.: 15/063,565

(22) Filed: Mar. 8, 2016

(65) Prior Publication Data

US 2016/0265409 A1    Sep. 15, 2016

(30) Foreign Application Priority Data

Mar. 10, 2015  (DE) .................... 10 2015 002 974

(51) Int. Cl.
*F01N 3/28* (2006.01)
*B01D 53/94* (2006.01)
(Continued)

(52) U.S. Cl.
CPC .......... *F01N 3/2892* (2013.01); *B01D 53/94* (2013.01); *B01F 3/04049* (2013.01);
(Continued)

(58) Field of Classification Search
USPC ........................................................ 60/296
See application file for complete search history.

(56) References Cited

U.S. PATENT DOCUMENTS

2009/0313979 A1* 12/2009 Kowada ............. B01D 53/9431
60/297
2010/0186393 A1* 7/2010 Kowada .................. F01N 3/035
60/295
(Continued)

FOREIGN PATENT DOCUMENTS

DE    102012008556    10/2013
DE    102012014334    5/2014
(Continued)

OTHER PUBLICATIONS

Search Report dated Jun. 15, 2016 which issued in the corresponding European Patent Application No. 16000510.4.

*Primary Examiner* — Walter D. Griffin
*Assistant Examiner* — Jelitza M Perez
(74) *Attorney, Agent, or Firm* — Cozen O'Connor

(57) ABSTRACT

A device for aftertreatment of exhaust gas includes: a prechamber having an exhaust gas inlet; a main chamber; a mixing device, in which the exhaust is mixable with an additive; and an intermediate device, via which a partial exhaust gas flow is deliverable from the prechamber to the mixing device. The intermediate device has swirl elements configured to reverse the direction of swirl of swirled exhaust gas flow generated in the prechamber as the exhaust gas overflows into the interior of the intermediate device, and/or the prechamber is configured to impel a first partial exhaust gas flow in a direction of swirl, and the main chamber is configured to impel a second partial exhaust gas flow from the prechamber in a direction of swirl, the direction of swirl of the exhaust gas in the prechamber being opposed to the direction of swirl of the exhaust gas in the main chamber.

24 Claims, 6 Drawing Sheets

(51) Int. Cl.
  *B01F 5/00*  (2006.01)
  *B01F 5/04*  (2006.01)
  *B01F 3/04*  (2006.01)

(52) U.S. Cl.
  CPC .......... *B01F 5/0062* (2013.01); *B01F 5/0451* (2013.01); *F01N 3/2896* (2013.01); *F01N 2240/20* (2013.01); *F01N 2470/04* (2013.01); *F01N 2470/18* (2013.01); *F01N 2490/08* (2013.01); *F01N 2610/02* (2013.01)

(56) References Cited

U.S. PATENT DOCUMENTS

| | | |
|---|---|---|
| 2014/0196441 A1 | 7/2014 | Katou |
| 2015/0040537 A1 | 2/2015 | Hicks |
| 2016/0076430 A1* | 3/2016 | Freeman ............... F01N 3/2066 60/301 |

FOREIGN PATENT DOCUMENTS

| | | |
|---|---|---|
| EP | 2687286 | 1/2014 |
| WO | WO 2006/138174 | 12/2006 |
| WO | WO2012/047159 | 4/2012 |

* cited by examiner direction of swirl, main chamber

DEVICE FOR THE AFTERTREATMENT OF EXHAUST GAS FROM A MOTOR VEHICLE

BACKGROUND OF THE INVENTION

1. Field of the Invention

The invention relates to a device for the aftertreatment of exhaust gases from an internal combustion engine, preferably of a motor vehicle, in particular a commercial vehicle, for example a heavy goods vehicle or a bus.

2. Description of the Related Art

DE 10 2012 014 334 A1 shows a device for the aftertreatment of exhaust gases from an internal combustion engine of a motor vehicle. The device comprises an exhaust gas inlet pipe, a mixing tube and a spiral housing. A metering device serves for delivering an additive into the mixing tube, wherein the additive should mix as homogeneously as possible with the exhaust gas in the mixing tube. One disadvantage to this is that the exhaust gas flow in the mixing tube deviates from a rotationally symmetrical exhaust gas flow, particularly in proximity to the additive feed device.

SUMMARY OF THE INVENTION

An object of the invention is to create an improved and/or alternative device for the aftertreatment of exhaust gas from an internal combustion engine, preferably of a motor vehicle.

According to one aspect of the invention, a device is provided for the aftertreatment of exhaust gas from an internal combustion engine, preferably by mixing the exhaust gas with an at least partially liquid additive (introduced, for example, by metered addition), evaporation of the liquid fraction of the additive and suitable preparation of the exhaust gas for a downstream catalytic converter.

In one aspect, the device comprises a prechamber having an exhaust gas inlet, a main chamber, a mixing device (for example a mixing tube) for mixing the exhaust gas with an additive (for example a urea-water solution) and an intermediate device (for example a nozzle device, in particular a nozzle cage). The intermediate device is designed so that a partial exhaust gas flow can be delivered from the prechamber to the mixing device via the intermediate device. The partial exhaust gas flow can preferably be delivered to the mixing device via the end face of the mixing device and/or of the intermediate device.

The intermediate device comprises swirl elements, for example swirl flaps, to reverse the direction of swirl/rotation of the swirled exhaust gas flow generated in the prechamber as the exhaust gas overflows into the interior of the intermediate device. Alternatively, or in addition, the prechamber may impel a partial exhaust gas flow in a direction of swirl/rotation. The main chamber may likewise impel a partial exhaust gas flow from the prechamber in a direction of swirl/rotation. The direction of swirl/rotation of the exhaust gas in the prechamber is suitably opposed to the direction of swirl/rotation of the exhaust gas in the main chamber.

This allows a substantially uniform and rotationally symmetrical inflow of the exhaust gas from the prechamber into the intermediate device and/or an axially and radially substantially uniform inflow of the exhaust gas from the main chamber into the mixing device. This suitably ensures that the additive admitted is exposed to a uniform incident flow from all sides, and in the mixing tube is thereby distributed symmetrically about the central axis of the mixing tube.

The prechamber might therefore also be suitably referred to as an exhaust gas distribution chamber, especially for distribution of the exhaust gas to the intermediate device on the one hand and to the main chamber on the other.

The mixing device may suitably have an exhaust gas flow connection to the prechamber via its circumferential surface and the main chamber. Alternatively or in addition, the mixing device may have an exhaust gas flow connection to the prechamber via its end face and in particular an end face of the intermediate device and passages in the circumferential surface of the intermediate device.

It is therefore possible for a partial exhaust gas flow to flow from the prechamber (preferably via the perforated dividing wall discussed below) into the main chamber and from the main chamber through the circumferential surface of the mixing device into the mixing device, and/or for a partial exhaust gas flow to flow from the prechamber through the circumferential surface of the intermediate device via the end face of the mixing device into the mixing device.

In terms of the exhaust gas flow the intermediate device is preferably arranged between the prechamber and the mixing device.

The intermediate device may be configured as a cylindrical tube or a conical tube (suitably with an angle of taper of 40° to 60°, for example).

The device preferably comprises a perforated separating device (for example a dividing wall).

It is possible for the mixing device to have an exhaust gas flow connection to the prechamber via its circumferential surface, the main chamber and the perforated separating device. In terms of the exhaust gas flow the separating device is suitably arranged between the prechamber and the main chamber.

The perforated separating device may be oriented obliquely and/or at right angles to the central axis of the intermediate device, the mixing device and/or the prechamber, for example.

The perforated separating device is preferably a perforated, for example lamellar dividing wall.

It is possible for the intermediate device to be enclosed by a casing element (for example a casing tube) in the circumferential direction of the intermediate device. The casing element may be of tubular design and/or of funnel-shaped design on the inlet side.

It is possible for the prechamber to have an internal contour and/or internal shape so as to impel exhaust gas, in particular the associated partial exhaust gas flow, in the prechamber in a direction of swirl/rotation, preferably so that it flows around the casing element. For this purpose, the prechamber may have a substantially oval cross section with a unilateral depression, in particular an oval cross section with different end radii and a unilateral depression situated between the end radii.

The main chamber preferably comprises an inlet hood and/or a spiral body.

It is possible for the cross section of the inlet hood to taper, suitably in the exhaust gas flow direction and/or starting from the perforated separating device.

The spiral body is designed, in particular, in order to impel exhaust gas, suitably the associated partial exhaust gas flow, in the main chamber, in particular the spiral body thereof, in a direction of swirl/rotation, preferably so that the direction of swirl of the exhaust gas in the main chamber, in particular the spiral body thereof, is opposed to the direction of swirl/rotation of the exhaust gas in the prechamber.

The mixing device, or at least portions thereof, preferably extends substantially centrally in the spiral body. An eccentric placement is also possible.

It is possible for the mixing device, in its circumferential surface, to comprise exhaust gas passages with inwardly issuing slits, preferably in order to prevent the metered additive introduced via the feed device being able to leave the mixing device in the direction of the main chamber, and/or for the slits to act as evaporation surfaces for the additive, when they are heated by the hot exhaust gas overflowing from the main chamber.

The flanks of the slits remote from the flow are preferably, at least in portions, of open design while the flanks of the slits facing the flow are, at least in portions, alternatively or additionally of closed design.

The slits on the mixing device may be staggered axially and/or radially in relation to one another.

The device comprises, in particular, a feed device (for example a nozzle and/or metering device) for delivering, in particular spraying, an additive (for example a urea-water solution) onto the exhaust gas.

The feed device is suitably arranged so as to deliver the additive into the intermediate device preferably at the end face, in particular substantially coaxially. That is to say, in particular, that the additive injection nozzle is oriented substantially coaxially with the intermediate device.

The intermediate device may be of conical or cylindrical shape.

At the end face the intermediate device connects indirectly or directly to a nozzle pod, suitably to a nozzle pod of the feed device for delivering the additive to the exhaust gas. The intermediate device is preferably closed at the end face by the nozzle pod.

The nozzle pod may have a conical shape. The conical shape of the nozzle pod suitably faces the intermediate device.

The intermediate device therefore preferably at one end face has an exhaust gas flow connection to the mixing device, while at the other end face the exhaust gas flow connection is closed but is provided with an additive injection nozzle.

The additive injection nozzle of the feed device is preferably fitted to the nozzle pod.

The nozzle pod is of a shape preferably tapering in the direction of the intermediate device, for example with a taper angle of 120° to 178°, preferably 150° to 175°.

It is possible for the intermediate device to have exhaust gas passages in its circumferential surface and/or no end-face exhaust gas outlet, in particular for it to be closed by the nozzle pod at the end face.

It is possible to leave an annular gap between the mixing device and the intermediate device, through which exhaust gas can likewise overflow into the mixing device, It is possible for the nozzle pod and the casing element to define an annular gap, via which the exhaust gas can be delivered from the prechamber to the intermediate device, in particular via exhaust gas passages in its circumferential surface.

In its circumferential surface the mixing device may have elongated exhaust gas passages, which may be suitably oriented parallel or obliquely to the central axis of the mixing device.

The intermediate device may have elongated exhaust gas passages in its circumferential surface, which may be suitably oriented in planes containing the central axis or in planes running obliquely to the central axis.

The slits of the mixing device may be of elongated design, suitably parallel or obliquely to the central axis of the mixing device.

The swirl elements of the intermediate device may be of elongated design, suitably oriented in planes containing the central axis or in planes running obliquely to the central axis.

The shape of the swirl elements may be substantially triangular, rectangular or trapezoidal.

It is possible for the direction of swirl/rotation of the exhaust gas delivered to the mixing device via the main chamber and the passages in the circumferential surface of the mixing device, and the direction of swirl/rotation of the exhaust gas delivered to the mixing device via the intermediate device, to be substantially the same.

The spiral body of the main chamber has a starting radius and an end radius and the starting radius preferably lies in a range from 120% to 190%, in particular 150% to 170%, of the end radius.

Also, in a simple embodiment the nozzle pod may be of lamellar design, for example, that is to say it need not necessarily be of a cupped design.

Once additive has been added to the exhaust gas there is a mixture of exhaust gas and additive present. In the context of the invention, therefore, the exhaust gas feature may suitably encompass exhaust gas with no additive prior to the addition of additive, and exhaust gas with additive, that is to say a mixture of exhaust gas and additive, following the addition of additive.

The nozzle pod preferably closes the intermediate device to an exhaust gas flow at the end face and at the same time provides an opening for the additive injection nozzle.

The invention is not confined to a device but also encompasses a motor vehicle, preferably a commercial vehicle, in particular a heavy goods vehicle or a bus, having a device as described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The preferred embodiments and features of the invention hitherto described may be combined with one another. Other advantageous developments of the invention are disclosed in or ensue from the following description of preferred embodiments of the invention in conjunction with the figures attached. In the drawings.

DETAILED DESCRIPTION OF THE PRESENTLY PREFERRED EMBODIMENTS

Figure 1:
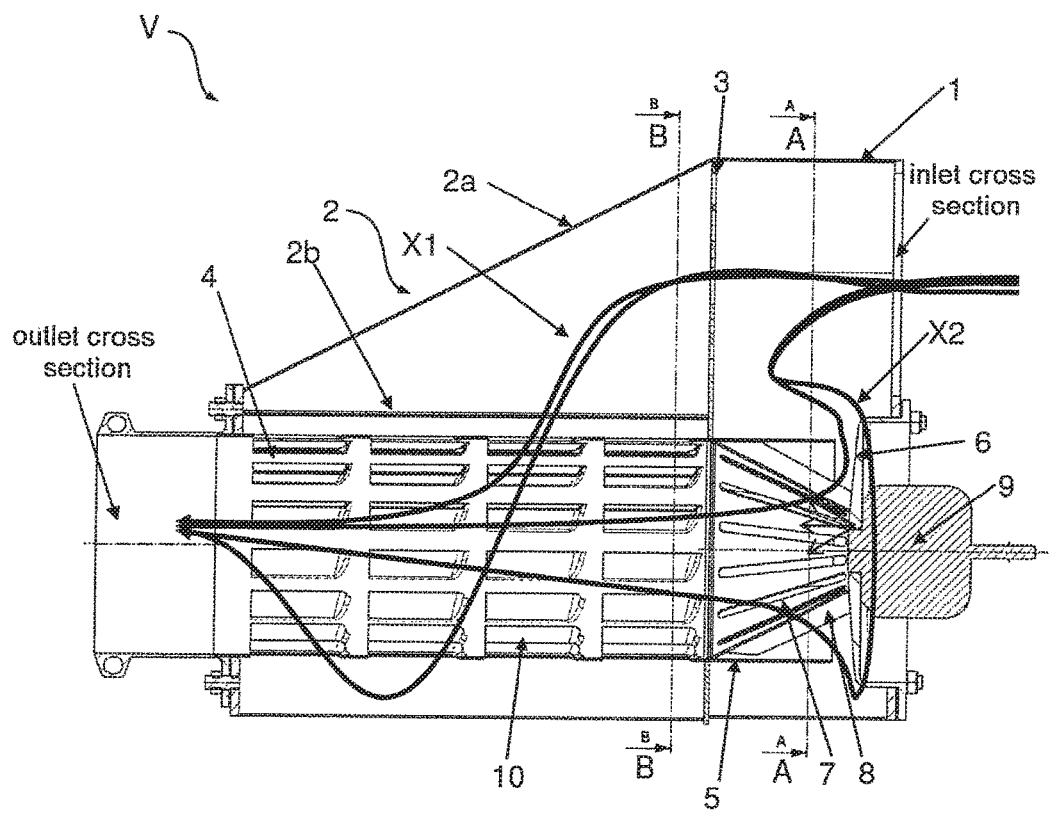
FIG. 1 shows a side view of a device according to one embodiment of the invention.

In The embodiments described with reference to the figures partially correspond, so that similar or identical parts are provided with the same reference numerals and are also explained by reference to the description of the other embodiments or figures, in order to avoid repetition.

FIG. 1 shows a device V for the aftertreatment of exhaust gas from an internal combustion engine, preferably by mixing the exhaust gas with an at least partially liquid additive (for example an aqueous urea solution) introduced by metered addition, evaporation of the liquid fraction of the additive and preparation of the exhaust gas-additive mixture for a downstream catalytic converter.

The device V comprises, in particular, a prechamber 1, a main chamber 2, a perforated separating device 3 (dividing wall), a mixing device 4 (mixing tube) and an intermediate device 7 (nozzle cage).

The prechamber 1 and the main chamber 2 are connected to one another firstly via the perforated dividing wall 3 and secondly via the mixing tube 4. The exhaust gas enters the prechamber 1 via an inlet cross section.

A partial exhaust gas flow X1 in the prechamber 1 passes via the perforated dividing wall 3 into the main chamber 2 and then through passages in the circumferential surface of the mixing tube 4 into the mixing tube 4.

A partial exhaust gas flow X2, that is to say the partial exhaust gas flow X2 remaining in the prechamber 1, passes through passages in the circumferential surface of the nozzle cage 7 into the nozzle cage 7 and thence into the mixing tube 4 at the end face. An end face of the nozzle cage 7 and an end face of the mixing tube 4 therefore have an interconnected exhaust gas flow.

The partial exhaust gas flow X2 is set in swirling motion, in particular by the contour/shape of the prechamber 1, and thereby flows around a casing element 5 (casing tube), which as an extension of the mixing tube 4 projects into the prechamber 1 and encloses the nozzle cage 7 in its circumferential direction.

The device V further comprises a feed device 9 to delivering an additive (for example an aqueous urea solution) to the exhaust gas. For this purpose, the feed device 9 comprises an additive injection nozzle.

An annular gap is formed between the casing tube 5 and a suitably tapered nozzle pod 6. The nozzle pod 6 closes the intermediate device 7 to an exhaust gas flow at the end face and at the same time provides an opening for the additive injection nozzle.

The partial exhaust gas flow X2 flows into the nozzle cage 7, in particular through the annular gap between the casing tube 5 and nozzle pod 6.

In the illustrated embodiment the nozzle cage 7 is a conical, perforated tube, having exhaust gas passages in its circumferential surface, but it may also be designed as a perforated cylindrical tube. At the front end area, the nozzle cage 7 is connected to the nozzle pod 6 at the end face and at the rear end area it opens into the mixing tube 4 at the end face.

The main chamber 2 comprises an inlet hood 2a and a spiral body 2b. The inlet hood 2a is designed so that its cross section tapers in the direction of flow. This ensures a uniform incident flow over the spiral body 2b in an axial direction.

Swirl elements 8 (swirl flaps; for the sake of clarity only one is provided with a reference numeral) are fitted to the outside of the nozzle cage 7.

The swirl flaps 8 ensure that exhaust gas (X2) is impelled in a direction of swirl.

The spiral body 2b ensures that exhaust gas (X1) is impelled in a direction of swirl.

The swirl flaps 8 cause the direction of swirl/rotation of the swirled exhaust gas flow generated in the prechamber 1 to be reversed as the exhaust gas, in particular the partial exhaust gas flow X2, overflows into the interior of the nozzle cage 7. This reversal of the swirled flow produces a very uniform and rotationally symmetrical inflow of the exhaust gas into the nozzle cage 7.

As the exhaust gas flows through the spiral body 2b it is impelled in a direction of swirl/rotation that is counter/opposed to the direction of swirl/rotation of the swirled flow in the prechamber 1. This swirled flow now flows around the mixing tube 4 situated in the center of the spiral of the spiral body 2b and ensures an axially and radially uniform penetration of the flow into the mixing tube. 4

In the nozzle cage 7 the partial exhaust gas flow X2 is subjected to the additive from the feed device 9.

In the mixing tube 4 the partial flow X2 subjected to the additive comes into contact with the partial exhaust gas flow X1.

The injection nozzle of the feed device 9 is fitted directly onto the nozzle pod 6. The substantially rotationally symmetrical flow of exhaust gas to the nozzle cage 7 means that the nozzle axis of the injection nozzle preferably lies precisely at the center of the exhaust gas flow. This achieves a uniform incident flow of the additive spray from all sides and the additive spray remains substantially rotationally symmetrical about the nozzle axis.

The exhaust gas flow in the nozzle cage 7 and the mixing tube 4 is composed of an axial and a rotational component. This flow means that an axial force and a radial force (centrifugal force due to rotational flow) are exerted on the additive droplets. The ratio of these two forces is crucial for a successful mixing and preparation of the mixture of exhaust gas and additive.

With an ideal ratio between the forces, the diameter of the additive spray pattern at the end of the nozzle cage 7 is just sufficient to ensure that the additive spray will not have experienced any wall contact, but the smallest droplets already strike the inside wall of the mixing tube 4 shortly after leaving the nozzle cage 7.

The mixing tube 4 is equipped with inwardly issuing slits 10 (for the sake of clarity only one is provided with a reference numeral), which prevent the exhaust gas-additive mixture flowing in from the prechamber 1 being able to leave the mixing tube 4 in the direction of the main chamber 2. Instead, the slits 10 act as evaporation surfaces, which are heated by the inflowing exhaust gas from the main chamber 2. Additive droplets, which are now deposited on the slits 10, can thus be evaporated.

Due to the penetration of the exhaust gas via the slits 10, the swirl strength in the mixing tube 4 constantly increases in the flow direction. As a result, ever larger additive droplets can be entrained by the flow downstream and transported outwards to the evaporation surface of the slits 10.

The exhaust gas-additive mixture leaves the mixing tube 4 at the rear end face of the mixing tube 4, ideally without any residual liquid additive constituents.

The perforation of the dividing wall 3 is of decisive importance for the flow fractions of the prechamber 1 and the main chamber 2. In addition, it has a decisive influence on a uniform incident flow over the spiral body 2b in the main chamber 2. A prechamber flow fraction from 10% to 30% has proven to be ideal. In addition, the dividing wall 3 affects the equal distribution in the prechamber and the main chamber and the pressure loss of the device. Through a suitable design arrangement and cross section of the perforation it is possible to optimize these parameters.

For ease of manufacture and low pressure loss, the casing tube 5 may be configured as a straight tube. For improved symmetry of the swirled flow, however, it has proved advantageous to widen the end of the casing tube 5 in a funnel shape on the annular gap side. The length of the casing tube 5 is responsible for the area of the annular gap between the casing tube 5 and the nozzle pod 6.

The design of the inlet hood 2a of the main chamber 2 has a decisive influence on the uniform incident flow over the spiral body 2b of the main chamber 2. It may be designed as described in DE 10 2012 014 334 A1. In addition, it has proved advantageous for the pressure loss, however, to use a tapering flow cross section. The taper of the flow cross section in the exhaust gas flow direction must be matched to the incident flow on the mixing tube 4 and the perforation of the dividing wall 3. A progressive tapering of the inlet hood 2a has proved particularly advantageous for an axially uniform incident flow over the spiral body 2b.

Figure 2:
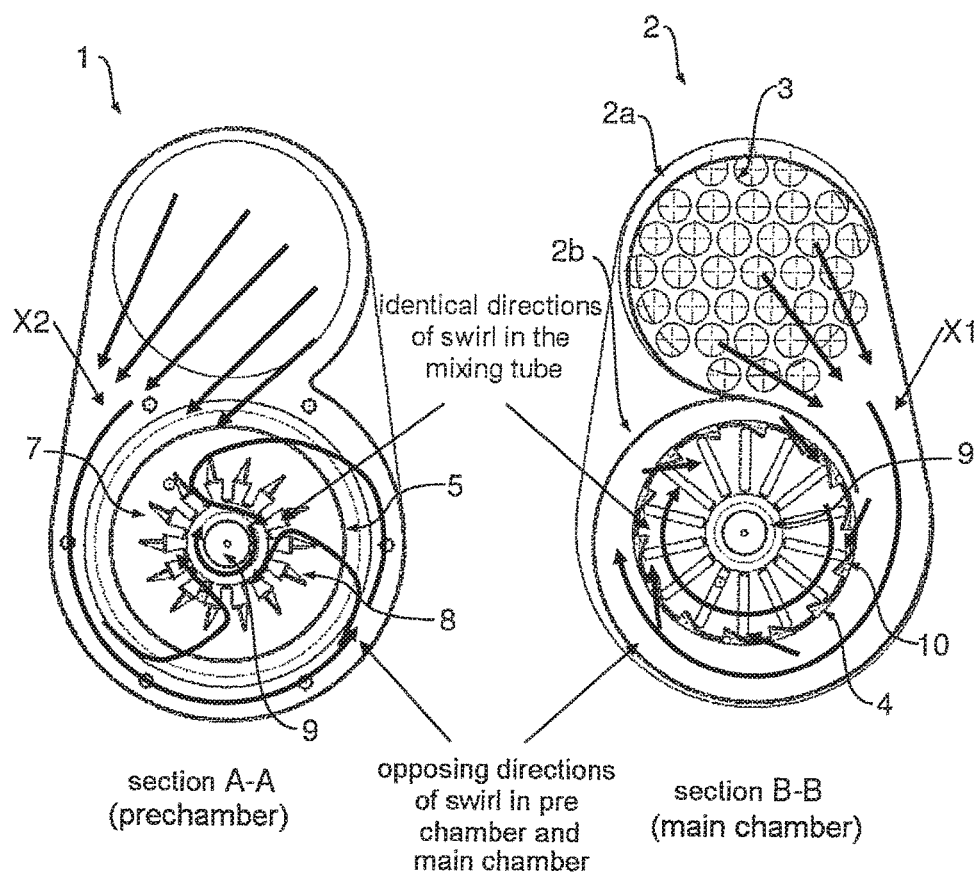
FIG. 2A shows a sectional view according to section A-A in FIG. 1.
FIG. 2B shows a sectional view according to section B-B in FIG. 1.

FIG. 2A shows a section A-A through the prechamber 1 according to FIG. 1, while FIG. 2B shows a section B-B through the main chamber 2 according to FIG. 1.

It can be seen in particular from FIG. 2A that the swirl elements 8 are designed to reverse the direction of swirl/rotation of the swirled exhaust gas flow generated in the prechamber 1 as the exhaust gas overflows into the interior of the nozzle device 7.b It can be seen in particular from FIG. 2B that the spiral body 2b impels the exhaust gas in a direction of swirl/rotation.

A comparison of FIGS. 2A and 2B shows, in particular, that the direction of swirl of the exhaust gas in the main chamber 2, in particular the spiral body 2b, generated by the spiral body 2b of the main chamber 2, and the direction of swirl of the exhaust gas in the prechamber 1 generated by the internal shape/internal contour of the prechamber 1 are opposed (counter) to one another.

It can further be seen from FIGS. 2A and 2B that the injection nozzle of the feed device 9, the nozzle cage 7, the mixing tube 4 and preferably the spiral body 2b and the casing tube 5 are oriented substantially coaxially.

It can also be seen that the direction of swirl of the exhaust gas which is led into the mixing device 7 via the main chamber 2 and the circumferential surface of the mixing device 7, and the direction of swirl of the exhaust gas which is led into the mixing device 4 via the intermediate device 7, are substantially the same.

Figure 3:
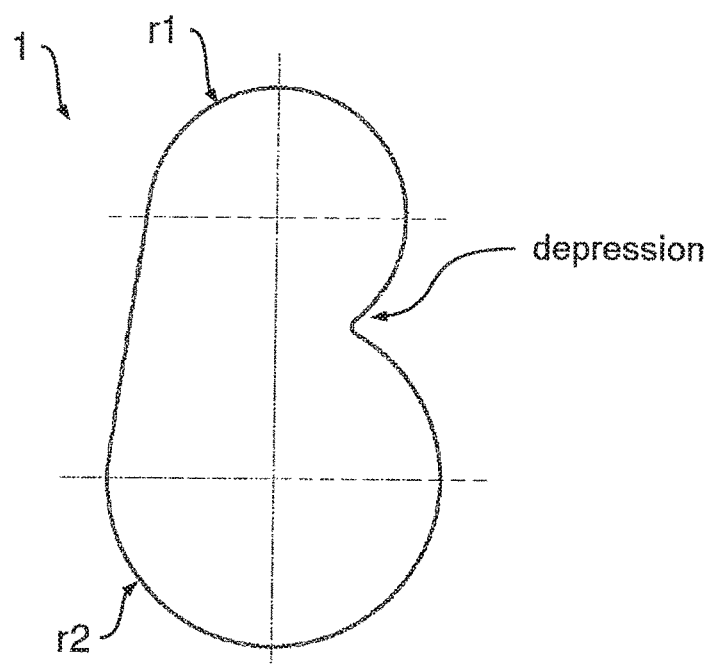
FIG. 3 shows a cross sectional view of the prechamber according to one embodiment of the invention.

FIG. 3 shows a cross section of the prechamber 1. The cross section of the prechamber 1 has a decisive influence on the swirl strength, the pressure loss and the symmetry of the swirled exhaust gas flow. Various designs are possible here, a substantially oval cross section with a unilateral depression, in particular an oval cross section having different end radii r1, r2 and a unilateral depression situated between the end radii r1, r2, having proved beneficial for the symmetry of the flow.

Figure 4:
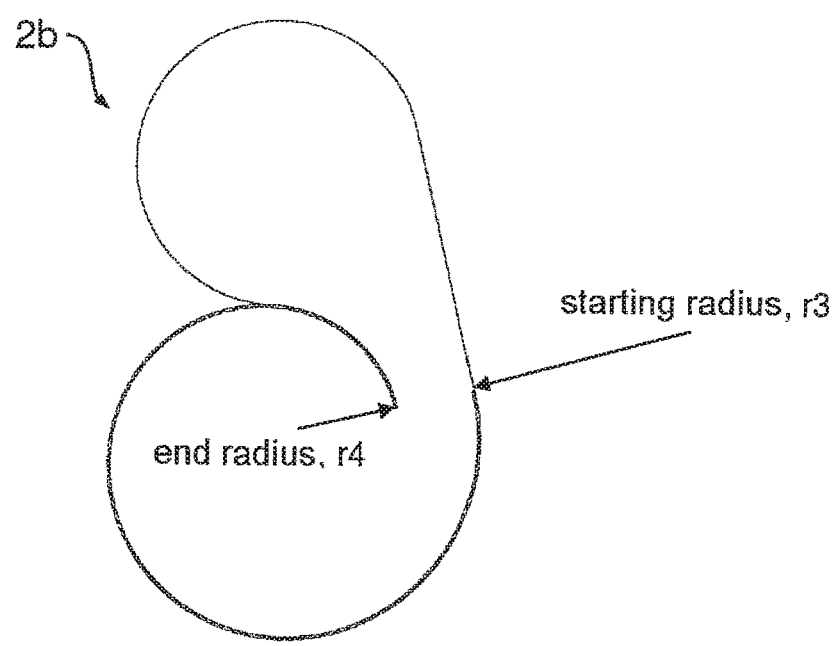
FIG. 4 shows a cross sectional view of the spiral body of the main chamber according to one embodiment of the invention.

FIG. 4 shows a cross section of the spiral body 2b. The design of the spiral body 2b in the main chamber 2 has a substantial influence on the strength of the swirled flow which flows into the mixing tube 4. Here a strong swirl proves advantageous for large droplet sizes of the additive. For smaller droplet sizes of the additive, on the other hand, a lighter swirl is advantageous. The swirl strength is adjusted via the ratio of starting radius r3 to end radius r4 of the spiral shape of the spiral body 2b.

Figure 5:
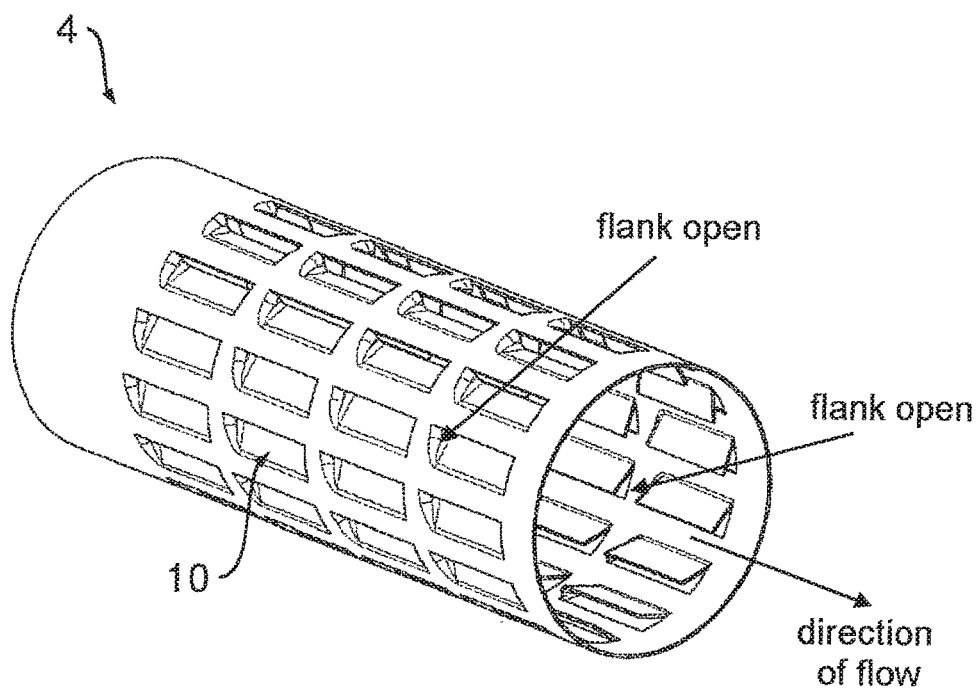
FIG. 5 shows a mixing device according to one embodiment of the invention.

FIG. 5 shows the mixing tube 4. The mixing tube 4 is the decisive component for the mixing and preparation of the exhaust gas-additive mixture. Its design influences the pressure loss of the whole device V, the residual liquid fraction at the end of the mixing tube 4 and the risk of crystalized additive fractions being deposited. One possible variation is of the diameter of the mixing tube 4. A cross section, the area of which is equal to 100% to 130% of the inlet cross section into the device (V), proves advantageous here. In the area of the main chamber 2 the mixing tube 4 is provided with radially arranged exhaust gas passages, which may be configured as described in DE 10 2012 014 334 A1.

In addition, it has proved advantageous in designing the slits 10 to make the flanks of the slits 10 remote from the flow open, to minimize the risk of deposits at this point.

Figure 6:
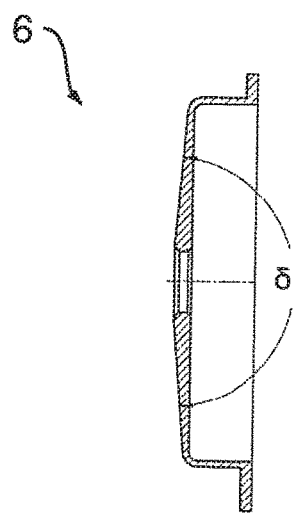
FIG. 6 shows a nozzle pod according to one embodiment of the invention.
Figure 7:
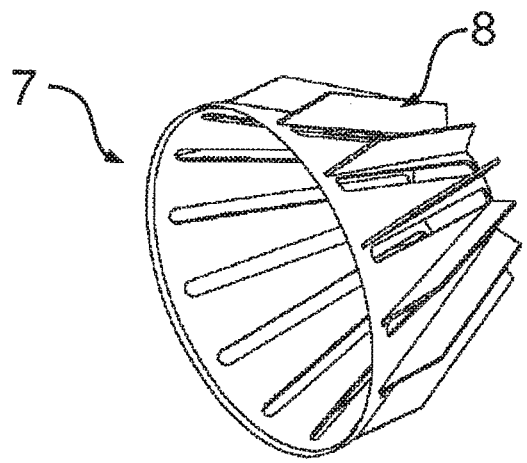
FIG. 7 shows a perspective view of an intermediate device according to one embodiment of the invention.
Figure 8:
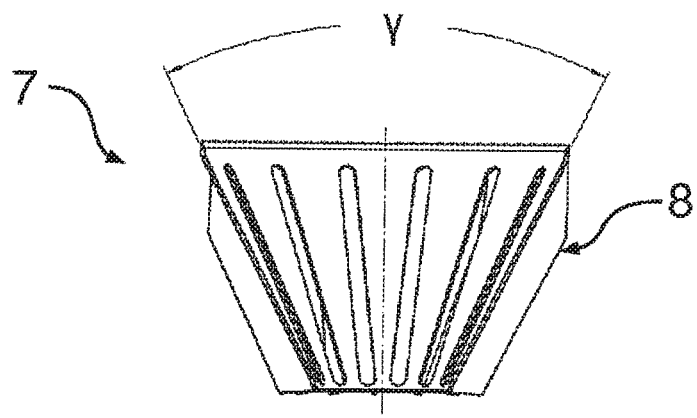
FIG. 8 shows a top view of the intermediate device in FIG. 7.
Figure 9:
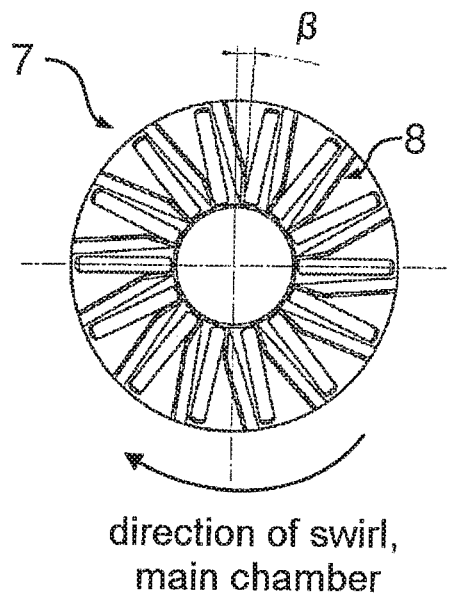
FIG. 9 shows a front view of the intermediate device in FIGS. 7 and 8.
Figure 10:
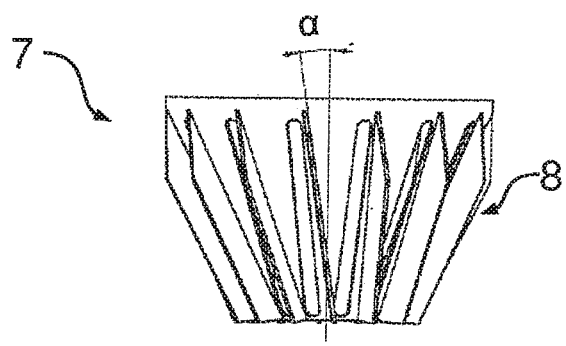
FIG. 10 shows a side view of the intermediate device in FIGS. 7 to 9.

FIG. 6 shows a cross section of the nozzle pod 6. Attached to the outside of the nozzle pod 6 is the injection nozzle for the additive, the nozzle tip of which then projects into the flow space or terminates flush with the flow space. The design of the pod construction therefore proves advantageous because the axial component of the exhaust gas flow is thereby oriented in the additive spray direction and a return flow can be prevented. This prevents the formation of deposits due to crystalized additive constituents. This orientation of the exhaust gas flow is also assisted by a conical design of the nozzle pod 6 on the inside.

FIGS. 7 to 10 show various views of the nozzle cage 7. Reference is made to FIGS. 7 to 10 below.

The nozzle cage 7 protects the additive spray from being entrained by the swirled flow prevailing in the prechamber 1 and regulates/controls the axial distribution of the inflowing exhaust gas in the prechamber 1 in the direction of the mixing tube 4. It is thereby possible to control the degree to which the additive spray is dispersed directly downstream of the nozzle outlet of the injection nozzle of the feed device 9. The object here is to achieve an ideal ratio between the axial and the radial flow. This is characterized in that the additive spray is dispersed just sufficiently to avoid contact with the wall of the nozzle cage 7 in the area of the nozzle cage 7.

The nozzle cage 7 may be configured either as a cylindrical or a conical tube, the conical design having proved more advantageous for a symmetrical flow at the nozzle outlet.

The nozzle cage 7 is perforated on the circumferential surface side and therefore comprises exhaust gas passages in the circumferential surface. Elongated holes, which may preferably be oriented parallel to the tube axis of the nozzle cage 7, have proved to be a particularly advantageous design.

The shape, number and length of the elongated holes are other design parameters which have an influence on the symmetry of the flow, the pressure loss and the axial distribution of the inflow.

The swirl flaps 8 are arranged radially outside on the nozzle cage 7 inside the casing tube 5 radial. Their number corresponds to the number of elongated holes in the nozzle cage 7. The design of the swirl flaps 8 has an influence on the strength of the swirl inside the nozzle cage 7 and decides the direction of rotation of the exhaust gas swirl.

The swirl flaps 8 may be of a substantially triangular, rectangular or trapezoidal design shape. The trapezoidal shape has proved particularly advantageous here.

The height, length, orientation and inclination may be cited as further variable parameters. These have an effect on the swirl strength, the swirl formation over the length of the nozzle cage 7 (linear, progressive, decreasing), pressure loss and symmetry of the flow. The parameters have a complex interaction with one another and must be matched to the particular additive spray.

The swirl elements 8 may be oriented in planes containing the central axis or oriented in planes running obliquely to the central axis.

The invention is not limited to the preferred embodiments described above. Rather, a number of variants and modifications are possible, which likewise make use of the idea of the invention and therefore come within the scope of the patent. In addition, the invention also claims protection for the subject matter and the features of the dependent claims irrespective of the features and claims referred to.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device (V) for aftertreatment of exhaust gas from an internal combustion engine, by mixing the exhaust gas with a metered addition of an at least partially liquid additive, evaporation of the liquid fraction of the additive, and preparation of the exhaust gas-additive mixture for a downstream catalytic converter, the device (V) comprising:
    a prechamber (1) having an exhaust gas inlet;
    a main chamber (2);
    a mixing device (4), in which the exhaust is mixable with an additive; and
    an intermediate device (7), via which a first partial exhaust gas flow (X2) is deliverable from the prechamber (1) to the mixing device (4), the intermediate device (7) having a circumferential surface,
    wherein:
    the intermediate device (7) has swirl elements (8) configured to reverse the direction of swirl of swirled exhaust gas flow generated in the prechamber (1) as the exhaust gas overflows into the interior of the intermediate device (7), and/or
    the prechamber (1) is configured to impel the first partial exhaust gas flow (X2) in a direction of swirl, and the main chamber (2) is configured to impel a second partial exhaust gas flow (X1) from the prechamber (1) in a direction of swirl, wherein the direction of swirl of the exhaust gas in the prechamber (1) is opposed to the direction of swirl of the exhaust gas in the main chamber (2).

2. The device (V) according to claim 1, wherein the mixing device (4) is connected to the prechamber (1) via a circumferential surface of the mixing device (4) and the main chamber (2) and/or is connected to the prechamber (1) via an end face of the mixing device (4) and the intermediate device (7).

3. The device (V) according to claim 1, wherein the mixing device (4) is connected to the prechamber (1) via an end face of the mixing device (4) and an end face of the intermediate device (7) and passages in a circumferential surface of the intermediate device (7).

4. The device (V) according to claim 1, wherein the mixing device (4) is connected to the prechamber (1) via a circumferential surface of the mixing device (4), the main chamber (2) and a perforated separating device (3) arranged between the prechamber (1) and the main chamber (2).

5. The device (V) according to claim 4, wherein the perforated separating device (3) is oriented one of:
    obliquely to a central axis of the intermediate device (7), the mixing device (4) and/or the prechamber (1) and
    at right angles to the central axis of the intermediate device (7), the mixing device (4) and/or the prechamber (1).

6. The device (V) according to claim 1, wherein the device (V) comprises a casing element (5) enclosing the intermediate device (7) in a circumferential direction of the intermediate device (7), the casing element (5) being configured as an extension of the mixing device (4).

7. The device according to claim 6, wherein the prechamber (1) has an internal shape configured so as to impel exhaust gas in the prechamber (1) in a direction of swirl, and/or to cause exhaust gas to flow around the casing element (5).

8. The device (V) according to claim 1, wherein the main chamber (2) comprises a spiral body (2*b*) configured to impel exhaust gas in the main chamber (2) in a direction of swirl.

9. The device (V) according to claim 8, wherein the main chamber (2) comprises an inlet hood (2*a*), wherein a cross section of the inlet hood (2*a*) tapers in the exhaust gas flow direction and/or tapers starting from a perforated separating device (3).

10. The device (V) according to claim 9, wherein at least a portion of the mixing device (4) extends centrally in the spiral body (2*b*).

11. The device (V) according to claim 1, further comprising a feed device (9) configured to introduce a metered additive,
    wherein:
    the mixing device (4) comprises exhaust gas passages having inwardly issuing slits (10) configured to prevent the metered additive introduced via the feed device (9) from leaving the mixing device (4) in the direction of the main chamber (2), and/or
    the slits (10) are configured as evaporation surfaces for the additive, when the slits (10) are heated by hot exhaust gas overflowing from the main chamber (2).

12. The device (V) according to claim 11, wherein the slits (10) have flanks, and at least portions of the flanks of the slits (10) remote from the exhaust gas flow are of open design and/or at least portions of the flanks of the slits (10) facing the flow are of a closed configuration.

13. The device (V) according to claim 11, wherein the slits (10) of the mixing device (4) are staggered axially and/or radially in relation to one another.

14. The device (V) according to claim 1, further comprising a feed device (9) configured to deliver an additive to the exhaust gas, the feed device (9) being configured so as to deliver coaxially the additive into the intermediate device (7).

15. The device (V) according to claim 1, wherein the swirl elements (8) protrude outward from the intermediate device (7).

16. The device (V) according to claim 6, further comprising a conical nozzle pod (6), wherein the intermediate device (7) at an end face thereof connects to the conical nozzle pod (6).

17. The device (V) according to claim 1, wherein the circumferential surface of the intermediate device (7) comprises exhaust gas passages and/or the intermediate device (7) has no end-face exhaust gas inlet.

18. The device (V) according to claim 1, wherein an annular gap, through which exhaust gas can overflow into the mixing device (4), is arranged between the mixing device (4) and the intermediate device (7).

19. The device (V) according to claim 16, wherein the conical nozzle pod (6) and the casing element (5) define an annular gap, via which exhaust gas is deliverable from the pre-chamber (1) to the intermediate device (7) via exhaust gas passages in the circumferential surface of the intermediate device (7).

20. The device (V) according to claim 1, wherein the mixing device (4) has elongated exhaust gas passages in a circumferential surface of the mixing device (4) and/or the intermediate device (7) has elongated exhaust gas passages in its circumferential surface.

21. The device (V) according to claim 11, wherein the swirl elements (8) and/or the slits (10) are elongated.

22. The device (V) according to claim 1, wherein the direction of swirl of the exhaust gas delivered to the mixing device (7) via the main chamber (2) and the circumferential surface of the mixing device (7), and the direction of swirl of the exhaust gas delivered to the mixing device (4) via the intermediate device (7), are the same.

23. The device (V) according to claim 11, wherein the feed device (9) has an additive injection nozzle, and the mixing device (4), the intermediate device (7) and the additive injection nozzle of the feed device (9) are oriented coaxially.

24. A motor vehicle having a device (V) according to claim 1.

* * * * *

UNITED STATES PATENT AND TRADEMARK OFFICE
CERTIFICATE OF CORRECTION

PATENT NO. : 9,982,584 B2
APPLICATION NO. : 15/063565
DATED : May 29, 2018
INVENTOR(S) : Maximilian Püschel and Herbert Albert It is certified that error appears in the above-identified patent and that said Letters Patent is hereby corrected as shown below:

On the Title Page

(71) Applicant(s) should read:
MAN Truck & Bus AG, Munich (DE)

Signed and Sealed this
Twentieth Day of November, 2018

Andrei Iancu
*Director of the United States Patent and Trademark Office*